(12) United States Patent
Aoki et al.

(10) Patent No.: US 7,556,852 B2
(45) Date of Patent: Jul. 7, 2009

(54) VEHICLE INTERIOR TRIM COMPONENT AND METHOD FOR MANUFACTURING THE SAME

(75) Inventors: Shinji Aoki, Tochigi (JP); Hiroya Imai, Tochigi (JP)

(73) Assignee: TS Tech Co., Ltd. (JP)

( * ) Notice: Subject to any disclaimer, the term of this patent is extended or adjusted under 35 U.S.C. 154(b) by 155 days.

(21) Appl. No.: 11/670,450

(22) Filed: Feb. 2, 2007

(65) Prior Publication Data

US 2007/0193198 A1 Aug. 23, 2007

(30) Foreign Application Priority Data

Feb. 3, 2006 (JP) ............................. 2006-027287

(51) Int. Cl.
  B60R 13/00 (2006.01)
  B60R 13/01 (2006.01)
  B32B 3/10 (2006.01)
  B32B 3/28 (2006.01)
  B32B 3/30 (2006.01)
  B32B 3/00 (2006.01)
  B60J 5/00 (2006.01)
  E04C 2/38 (2006.01)

(52) U.S. Cl. ................ 428/172; 428/167; 428/131; 428/134; 428/136; 428/31; 296/146.7; 296/39.1; 52/716.5; 52/716.6; 52/716.7

(58) Field of Classification Search ............. 296/146.7, 296/39.1; 428/156, 167, 131, 136, 134, 31, 428/172; 52/716.5, 716.6, 716.7
See application file for complete search history.

(56) References Cited

FOREIGN PATENT DOCUMENTS

| JP | 10-000687 | 1/1998 |
|---|---|---|
| JP | 11-156875 | 6/1999 |
| JP | 2000-343612 | 12/2000 |
| JP | 2003-246243 | 9/2003 |
| JP | 2005-053435 | 3/2005 |
| JP | 2005053435 A * | 3/2005 |

* cited by examiner

Primary Examiner—Jennifer McNeil
Assistant Examiner—Catherine Simone
(74) Attorney, Agent, or Firm—Schiff Hardin LLP

(57) ABSTRACT

A vehicle interior trim component and a method for manufacturing the same are provided in which a vehicle interior trim component comprises a substrate provided with a groove portion having a plurality of bottomed groove portions and a plurality of cutout groove portions from which the bottoms have been cut, and a trim member provided with a first cover portion, the second cover portion, and a fixing member mounted on a boundary portion between the first cover portion and the second cover portion, the first cover portion located on the opposite side of the groove portion from a second cover portion, the trim member covering the substrate. The boundary portion including the fixing member is attached to the groove portion by insertion through one end of the groove portion. Each of the cutout groove portions is provided on its edge with a retainer for retaining the fixing member.

13 Claims, 15 Drawing Sheets

F I G. 4
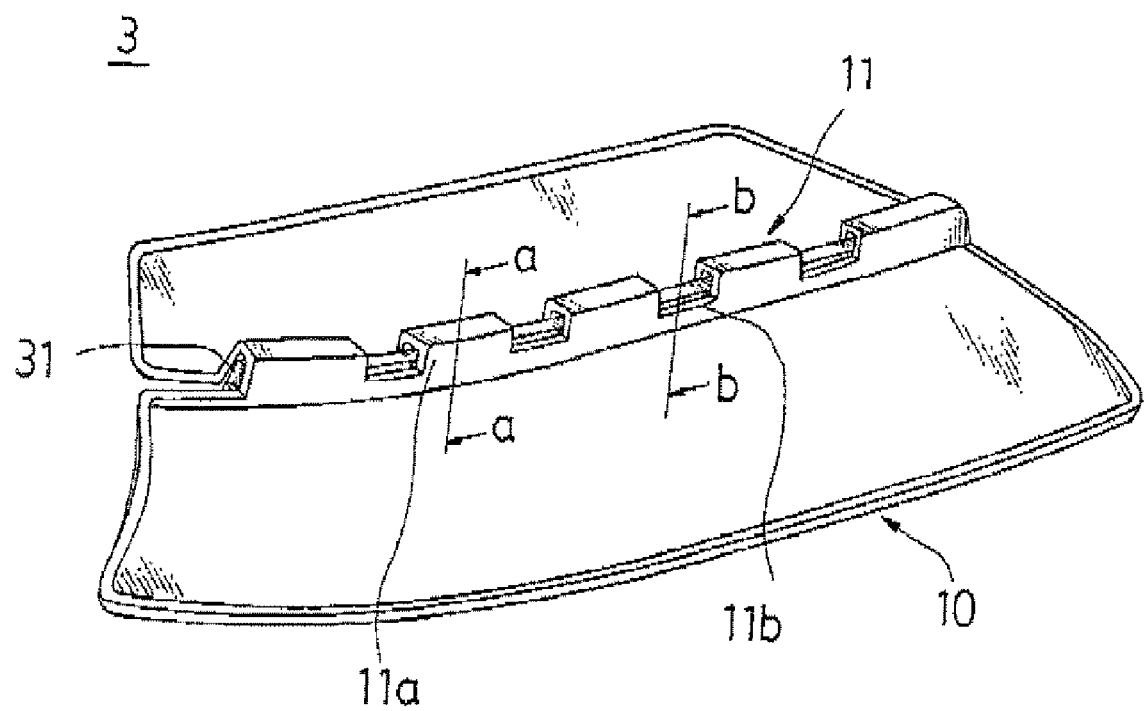

F I G. 8
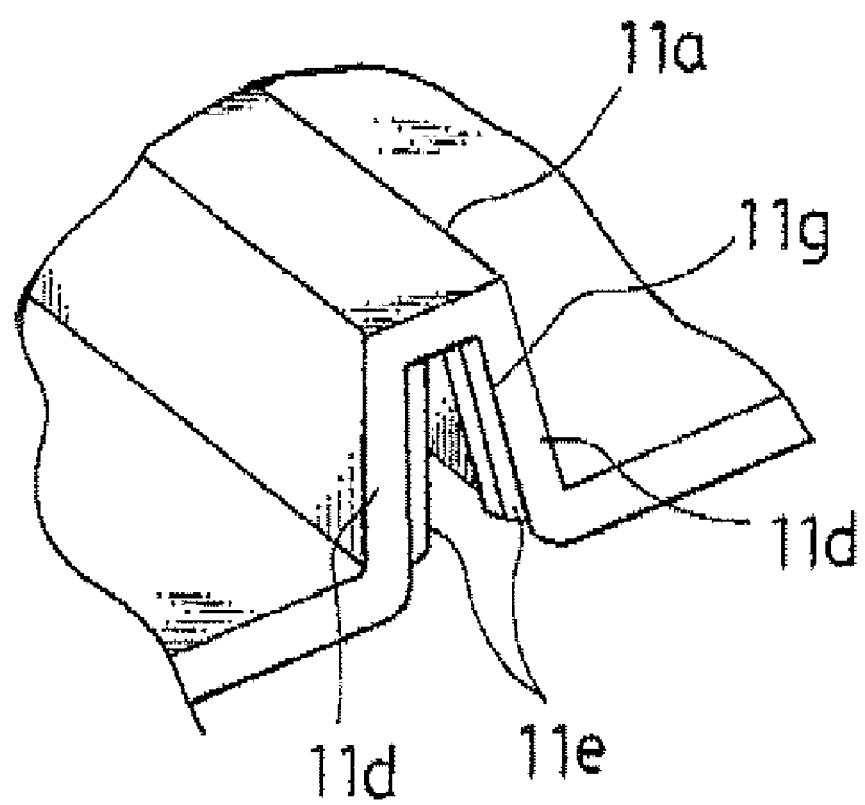

F I G. 1 0
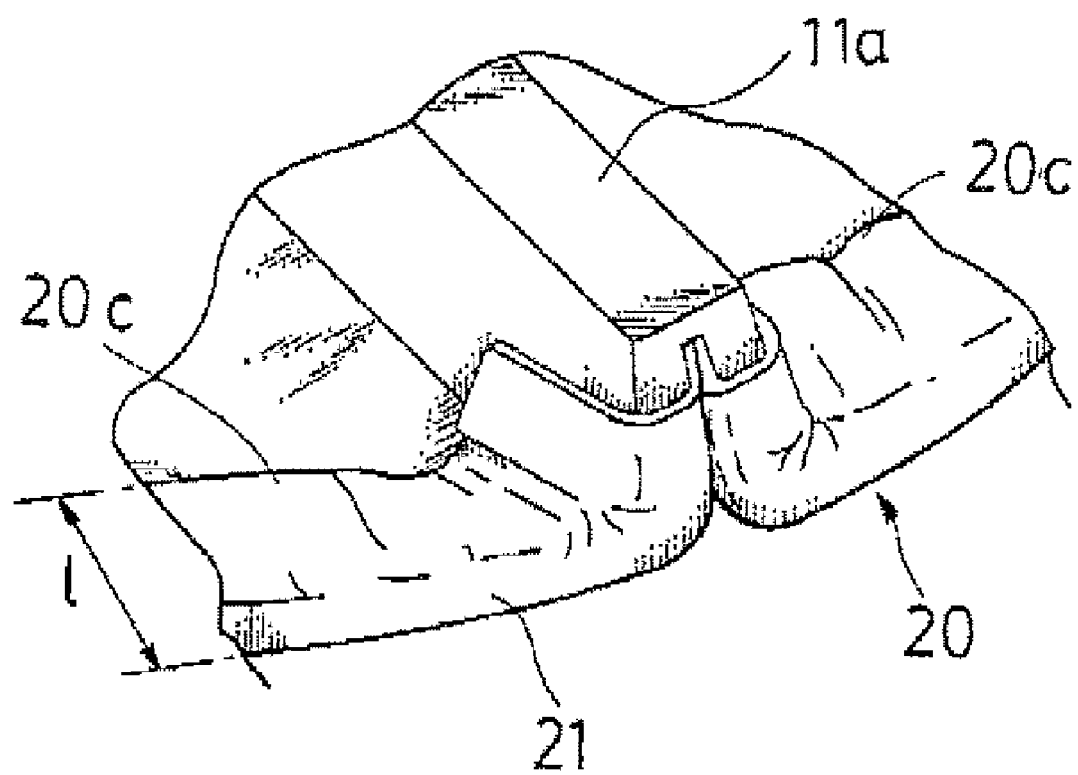

F I G. 1 1
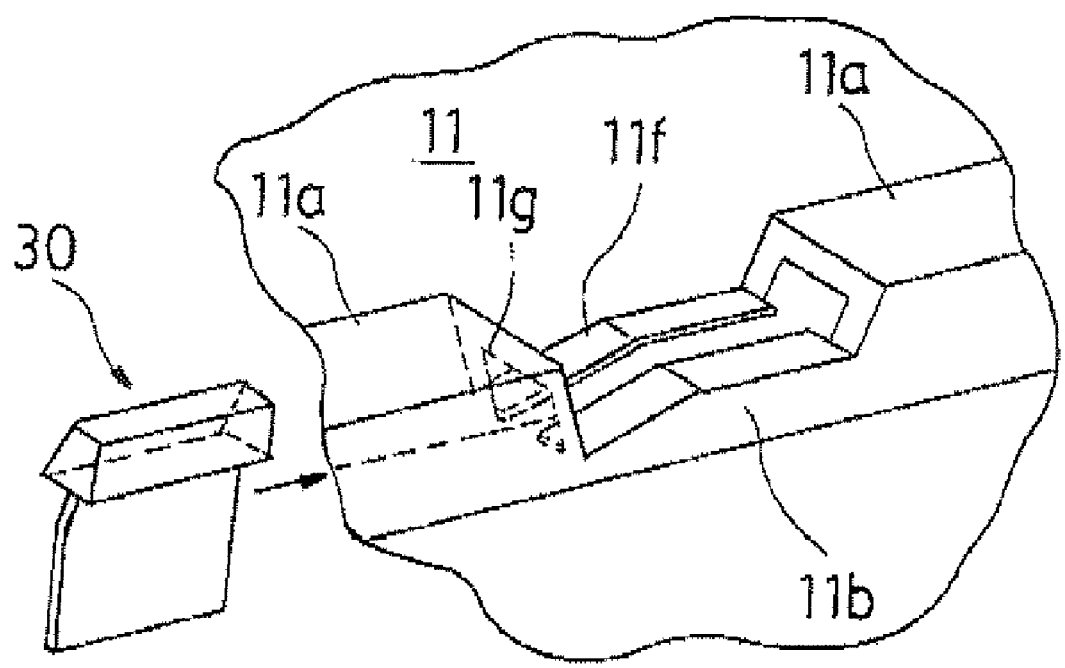

VEHICLE INTERIOR TRIM COMPONENT AND METHOD FOR MANUFACTURING THE SAME

BACKGROUND

The present invention relates to a vehicle interior trim component and a method for manufacturing the same, and is particularly related to a vehicle interior trim component with a groove portion and a method for manufacturing the same.

A vehicle interior trim component, such as a door trim of an automobile obtained by covering a substrate with a trim member, is known. This type of vehicle interior trim component is covered with a trim member so as to provide an aesthetically pleasing appearance in the passenger compartment.

If the trim members are disposed in two adjacent areas, this provides a non-monotonous/varied impression and its appearance is improved. In addition, if different trim members were disposed in the two adjacent areas respectively, this would further improve its appearance.

For providing such a vehicle interior trim component, a plurality of substrates 110 have been used as shown in FIG. 15. Each substrate 110 is mounted with a trim member 120 respectively, and these substrates 110 are assembled into a trim component.

According to this conventional art, the vehicle interior trim component, such as a door trim, appears luxurious and varied.

However, since the decorated area of such a vehicle interior trim component consists of the two separate members, these members can be easily separated from each other by a gap. The gap detracts from an appearance of a finished vehicle interior trim component.

A method for manufacturing a vehicle interior trim component to overcome this disadvantage is disclosed in, for example, Japanese Patent Laid-Open No. 11-156875. According to this conventional method, a cover material comprises two areas with different colors. At the boundary between the two areas, a notch which does not allow the two areas to separate from each other is made. Then, the cover material is applied onto a die so that the notch is positioned on a ridge of the die, and a substrate is heated and softened so that the cover material and the substrate are integrally molded.

According to this disclosure, since the edge of the ridge is thin enough, a groove between the two areas becomes narrow. Since the boundary between the two areas with different colors can be inserted in the narrow groove, the manufactured vehicle interior trim component can be decorated by a two-tone cover material and can provide an aesthetically pleasing appearance.

However, this method requires a step of making a notch in the cover material with a die having a knife-state blade. Therefore, this method requires reequipping of its manufacturing line and this leads to higher costs. Moreover, since the notch needs to be precisely positioned on the ridge of the die when applying the cover material onto the die, this takes additional labor.

A need therefore exists to provide a vehicle interior trim component with trim members in a plurality of adjacent areas divided by grooves, which provides an aesthetically pleasing appearance.

Moreover, a need exists to provide a method for manufacturing a vehicle interior trim component with trim members in a plurality of adjacent areas divided by grooves, in which the vehicle interior trim component can be produced in a simple and cost effective manner, and in which the resulting vehicle interior trim component provides an aesthetically pleasing appearance.

SUMMARY

The present invention has been developed in order to overcome the above disadvantages of the above conventional art. According to one aspect of the present invention, a vehicle interior trim component is provided. This vehicle interior trim component comprises a substrate provided with a groove portion having a plurality of bottomed groove portions and a plurality of cutout groove portions having cut out portions of the bottoms, and a trim member provided with a first cover portion, a second cover portion, and a fixing member mounted on a boundary portion between the first cover portion and the second cover portion, the trim member covering the substrate, wherein the boundary portion including the fixing member is attached to the groove portion by insertion through one end of the groove portion, and wherein each of the cutout groove portions is provided on its edge with a retainer for retaining the fixing member.

The fixing member may comprise a first portion connected to the boundary portion of the trim member and a second portion connected to the first portion and engaged with the retainer. The first portion may be made of material softer than the second portion material.

The groove portion may be provided in one end zone thereof with a mechanism for holding the trim member between for fixing the trim member to the substrate.

The groove portion may be provided in one end zone thereof with a pair of projections extending respectively from a pair of walls of the groove portion. The groove portion may be provided at one end thereof with one of the bottomed groove portions, the bottomed groove portion provided in its one end zone constituting its entrance/exit with a pair of projections extending respectively from a pair of walls of the groove portion, the projections narrowing the width of the entrance/exit.

Each of the bottomed groove portions may be provided at one end thereof adjacent to one of the cutout groove portions with a tapered portion, a pair of inner surfaces of the tapered portion tilted in the longitudinal direction of the groove portion toward inside of the bottomed groove portion. Each of the cutout groove portions may be provided at one end thereof with a slant surface tilted toward the adjacent bottomed groove portion. Each of the bottomed groove portions may be provided at one end thereof adjacent to one of the cutout groove portions with a tapered portion, a pair of inner surfaces of the tapered portion tilted in the longitudinal direction of the groove portion toward inside of the bottomed groove portion.

According to another aspect of the present invention, a method for manufacturing a vehicle interior trim component is provided. This method for manufacturing a vehicle interior trim component comprises: forming a trim member having a first cover portion and a second cover portion, and forming a substrate provided with a groove portion having a plurality of bottomed groove portions and a plurality of cutout groove portions having cut out portions, the each of cutout groove portions provided on its edge with a retainer, mounting a fixing member on a boundary portion between the first cover portion and the second cover portion of the trim member, inserting the boundary portion of the trim member including the fixing member into the groove portion of the substrate through one end of the groove portion, and allowing the fixing member to be engaged with the retainer, and covering the substrate by the trim member.

Forming the trim member may further comprise connecting a first portion fixed on the boundary portion of the trim member to a second portion engaging the retainer so as to form the fixing member comprising the first and the second portions.

The method may further comprise previously forming the first portion from material softer than the second portion material.

Covering the substrate may further comprise holding the trim member between a means for holding provided in one end zone of the groove portion and fixing the trim member to the substrate.

Forming the trim member may further comprise forming a pair of projections extending respectively from a pair of walls of the groove portion in one end zone thereof, and covering the substrate may further comprise holding the trim member between the projections to fix the trim member to the substrate.

Forming the trim member may further comprise forming one of the bottomed groove portion at one end of the groove portion, and forming a pair of projections extending respectively from a pair of walls of one end zone of the bottomed groove portion so that the projections narrow the width of the end zone constituting a entrance/exit, and covering the substrate may further comprise holding the trim member between the projections to fix the trim member to the substrate.

Forming the trim member may further comprise forming a tapered portion at one end of each of the bottomed groove portions adjacent to each of the cutout groove portions, a pair of inner surfaces of the tapered portion tilted in the longitudinal direction of the groove portion toward inside of the bottomed groove portion.

Forming the trim member may further comprise forming a slant surface at one end of each of the cutout groove portions, the slant surface tilted toward the adjacent bottomed groove portion.

Forming the trim member may further comprise forming a tapered portion at one end of each of the bottomed groove portions adjacent to each of the cutout groove portions, a pair of inner surfaces of the tapered portion tilted in the longitudinal direction of the groove portion toward inside of the bottomed groove portion.

BRIEF DESCRIPTION OF THE DRAWINGS

The present invention will be described below by way of example according to various preferred embodiments illustrated in the drawings and following descriptive text

FIG. 4 is a perspective view of a substrate and a trim member assembled together;

FIG. 8 is a perspective pictorial view of an embodiment of projections of a groove portion;

FIG. 10 is a perspective pictorial view of the fixed terminal portion of the trim member;

FIG. 11 is a perspective pictorial view of an alternative embodiment of a groove portion;

DETAILED DESCRIPTION OF THE PREFERRED EMBODIMENTS

Figure 1:
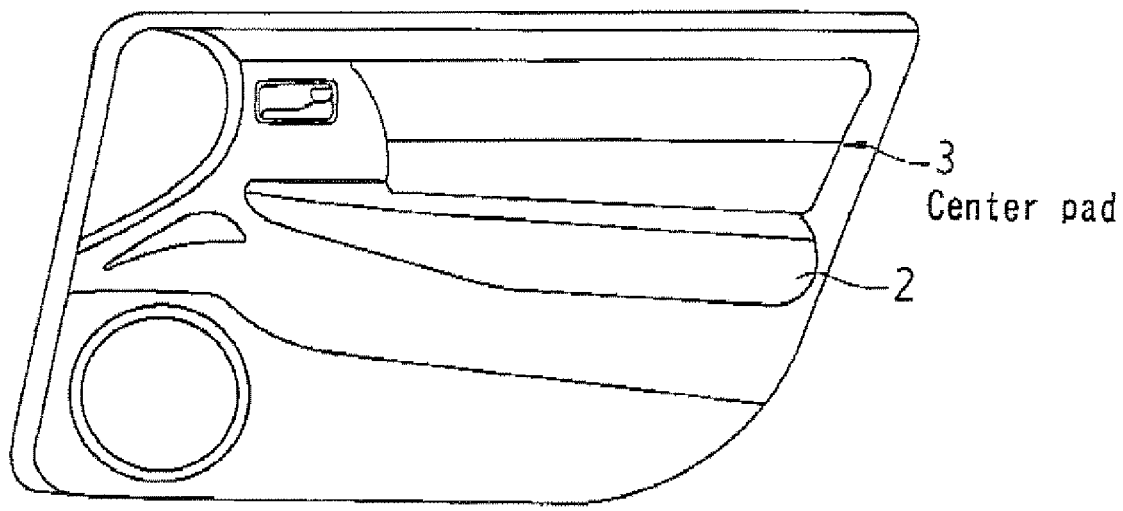
FIG. 1 is an outline pictorial view of a door trim according to one embodiment of a vehicle interior trim component.

FIG. 1 illustrates a door trim 1 that is an embodiment of a vehicle interior trim component of the present invention. The door trim 1 is an interior trim member for decorating an inner side of a vehicle door, and is provided with a center pad 3 above an arm rest 2. The center pad 3 is decorated with leather, synthetic leather, genuine leather or the like.

Figure 2:
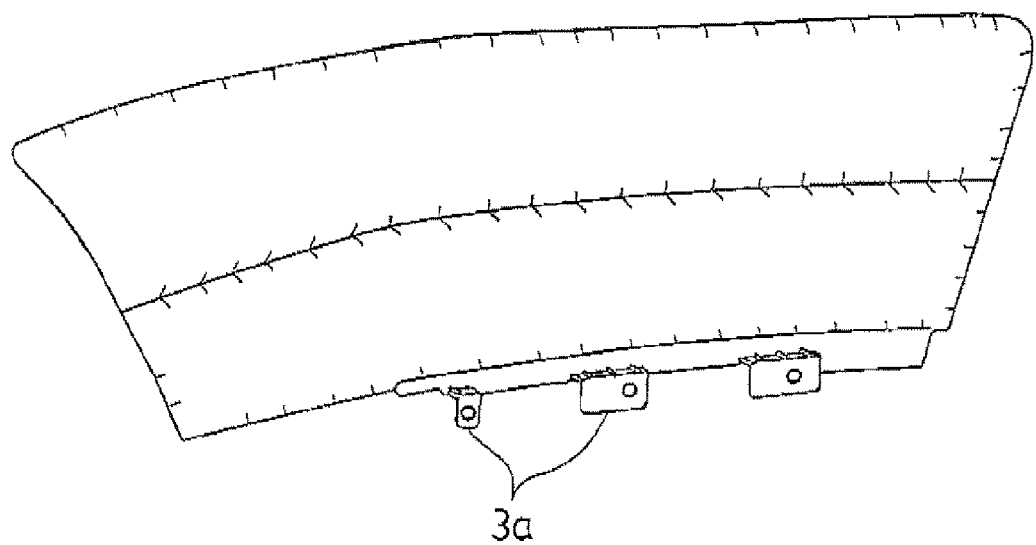
FIG. 2 is an enlarged pictorial view of a center pad.
Figure 3:
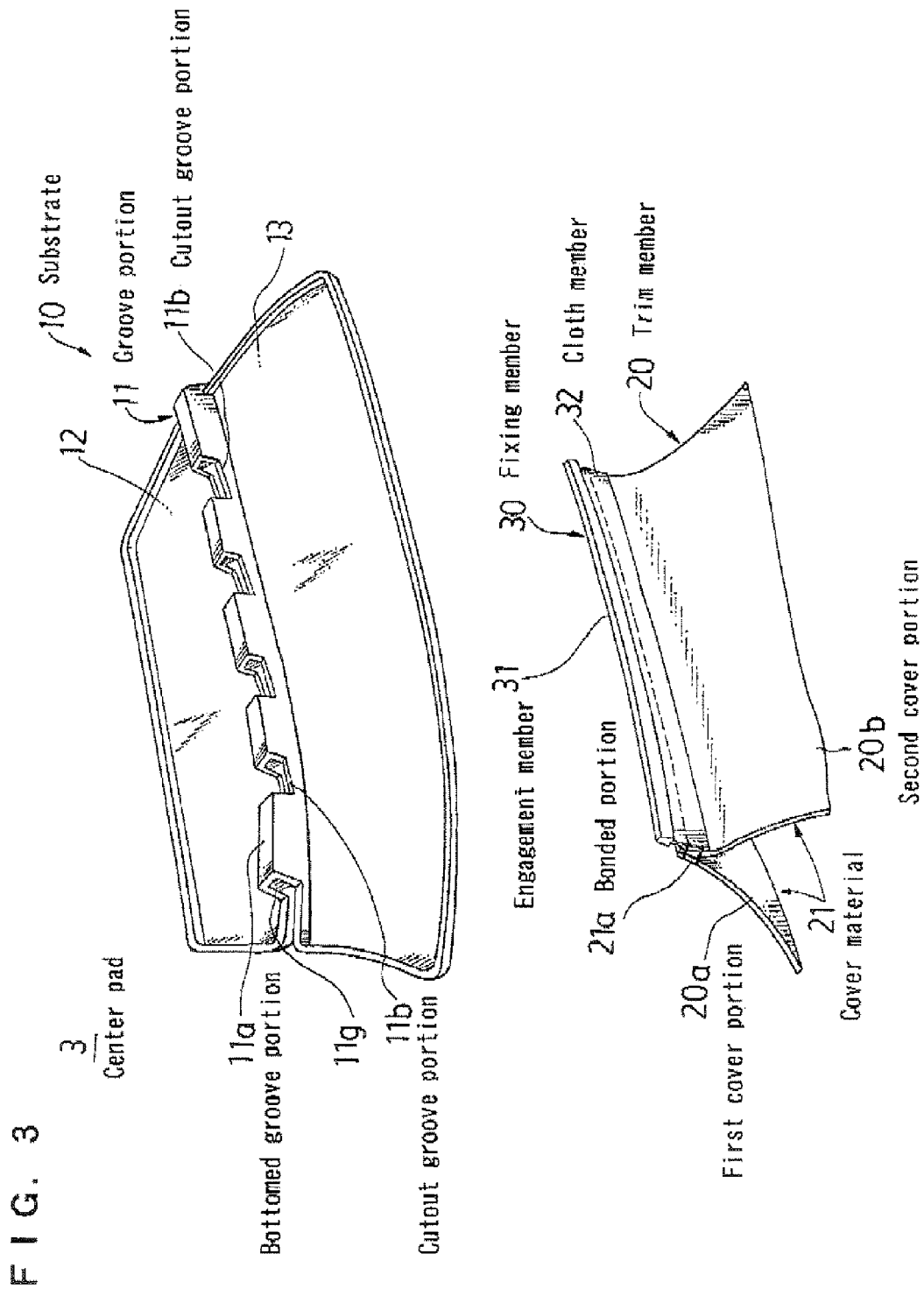
FIG. 3 is an exploded perspective pictorial view of the center pad.

FIG. 2 is an enlarged view of the center pad 3 of the door trim 1. As shown in FIGS. 2 and 3, the center pad 3 comprises (see FIG. 3) a substrate 10 made of rigid resin such as polypropylene, and a trim member 20 for covering the surface of the substrate 10. The center pad 3 comprises an engagement portion 3a, and is mounted on the door trim 1 by this engagement portion 3a.

The trim member 20 is divided into an upper and a lower areas in the vehicle body direction at the center of the center pad 3. FIG. 3 is an exploded perspective view of the center pad 3, showing the substrate 10 and the trim member 20 constituting the center pad 3. For clarity, the engagement portion 3a of the center pad 3 is omitted in FIG. 3.

As shown in FIG. 3, the substrate 10 comprises a groove portion 11 located at the center thereof and surfaces 12, 13, located on both sides of the groove portion 11.

The substrate 10 comprises the groove portion 11. The groove portion 11 is comprised of a bottomed groove portion 11a having a substantially Unshaped cross-section and a cutout groove portion 11b adjacent to the bottomed groove portion 11a. The cutout groove portion 11b has a shape similar to the groove portion 11, but a bottom of the cutout groove portion 11 is cut out.

Figure 5:
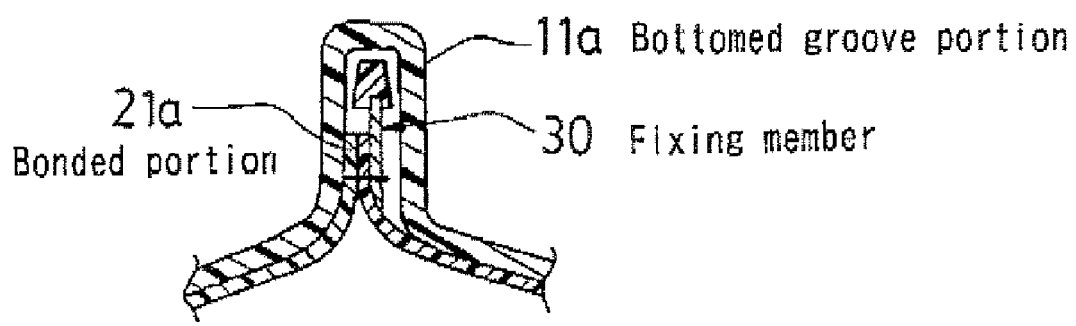
FIG. 5 is a sectional view taken along line a-a of FIG. 4.
Figure 6:
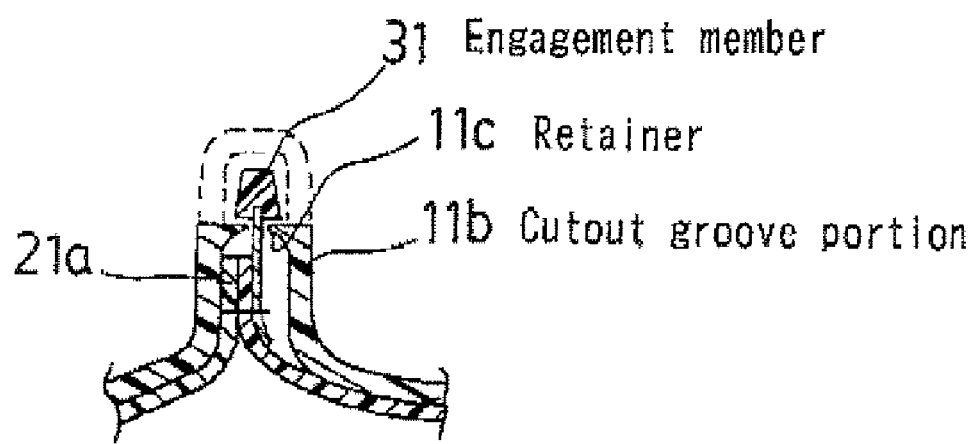
FIG. 6 is a sectional view taken along line b-b of FIG. 4.
Figure 7:
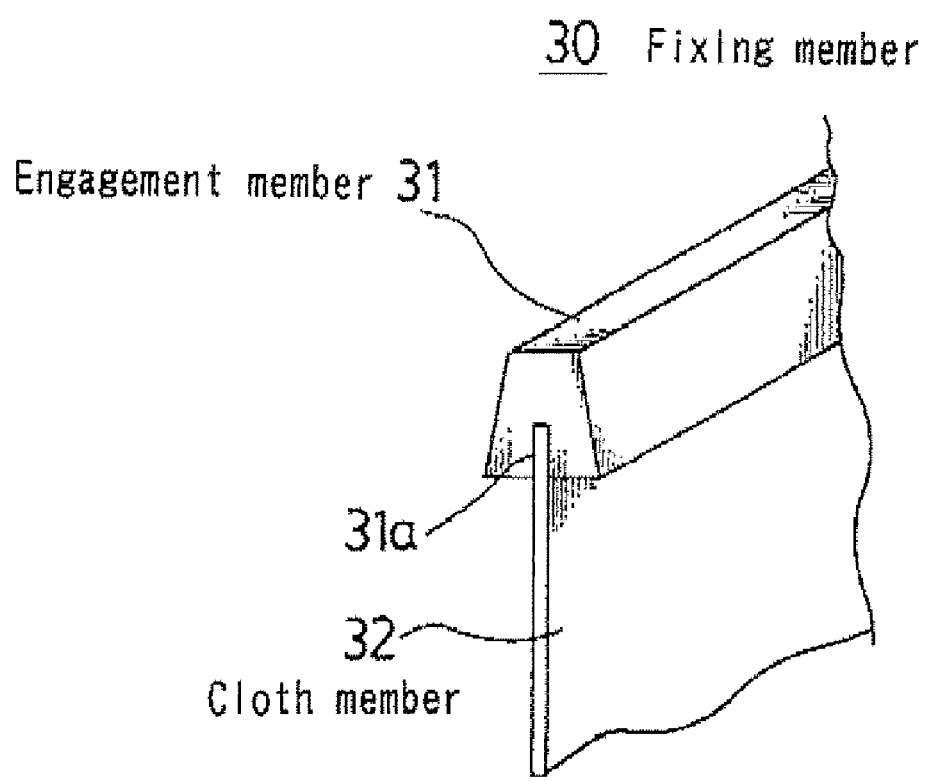
FIG. 7 is a perspective pictorial view of a fixing member.

The bottomed groove portion 11a is formed as a hollow member with a U-shaped cross-section as shown in FIG. 5. The cutout groove portion 11b has a bottomless shape as shown in FIG. 6, and its two edges extend inwardly so as to narrow the width of the gap between the two edges. The portion of the edge extending inwardly constitutes a retainer 11c of the trim member 20 and is provided for prohibiting trim member 20 from dropping off from the groove portion 11. In this embodiment, since the retainer 11c is provided at the bottomless cutout groove portion 11b, the substrate 10 can be easily produced only with an upper and a lower die instead of using a slide die or the like by molding.

The trim member 20 comprises a first cover portion 20a and a second cover portion 20b for covering the surfaces 12, 13 of the substrate 10.

The trim member 20 of this embodiment is, as shown in FIG. 3, formed by bonding two cover materials 21. Each of the two cover materials 21 constitutes a first cover portion 20a and a second cover portion 20b of the trim member 20 and covers the surfaces 12, 13 of the substrate 10.

Although the two cover materials 21 are sewn together in this embodiment, they may alternately be adhesively bonded or welded together (or any combination of these or other known attachment techniques). Each cover material 21 may have the same color or pattern, or may be made of the same material, and may also have different colors or patterns from each other, or may be made of different materials from each other. The cover material may have a lining material such as polyurethane foam in the back.

The ends of two cover materials 21 are sewn together, and a bonded portion 21a is formed at the sewn end. In this embodiment, the seam portion between the two cover materials 21 corresponds to the bonded portion 21a. This bonded portion 21a is an embodiment of the boundary portion of the trim member 20.

The trim member 20 may be formed as a single cover material 21 folded in half instead of being formed by bonding two separate cover materials 21 as this embodiment. In this case, the ridge of the folded cover material 21 corresponds to the boundary portion of the trim member 20 of an alternative embodiment.

At the boundary portion of the trim member 20, a fixing member 30 is disposed. In this embodiment, the fixing member 30 is disposed at the bonded portion 21a of the two cover materials 21. The fixing member 30 is provided for fixing the trim member 20 to the substrate 10.

The fixing member 30 comprises an engagement member 31 made of resin such as polypropylene and a cloth member 32 connected to this engagement member 31. The cloth member 32 is an embodiment of the first portion and the engagement member 31 is an embodiment of the second portion. The engagement member 31 and the cloth member 32 are fixed to each other at a bonded portion 31a.

According to the embodiment as described here, the fixing member 30 is comprised of the engagement member 31 made of resin and the cloth member 32. However, the fixing member 30 is not limited to this; for example, the fixing member 30 including the first portion and the second portion may be integrally formed into an integral structure. In this case, it will be appreciated that if the fixing member 30 were made of resin, the first portion to be bonded to the trim member 20 could be made of low-hardness material, and the second portion to be engaged with the retainer could be made of high-hardness material.

Since the first portion is made of soft material, the first portion can easily follow the cover material 21; as a result, this can prevent the cover material 21 from wrinkling. More specifically, when the first portion is formed as the cloth member 32 as is shown in this embodiment, the cloth member 32 can smoothly follow the cover material 21. Therefore, even when the substrate 10 has a more uneven shape, the substrate 10 covered by the trim member 20 can provide an aesthetically pleasing appearance.

The fixing member 30 is mounted to the trim member 20 by sewing the cloth member 32 to the bonded portion 21a of the cover material 21. The fixing member 30 is mounted to the trim member 20 for extending in the longitudinal direction along the bonded portion 21a. The trim member 20, which the fixing member 30 is mounted to, is mounted onto the substrate 10.

FIG. 4 shows the substrate 10 and the trim member 20 assembled together. As shown in FIG. 4, the trim member 20 is mounted to the substrate 10 by disposing the bonded portion 21a and the engagement member 31 of the fixing member 30 in the groove portion 11 of the substrate 10.

The process to assemble the substrate 10 and the trim member 20 will be described here. As the first step, the trim member 20 which the fixing member 30 is mounted to is positioned near one end of the groove portion 11 of the substrate 10. Then, the engagement member 31 of the fixing member 30 is slid and inserted through an entrance/exit 11g (FIG. 8) at one end of the groove portion 11. The engagement member 31 first enters the bottomed groove portion 11a, and then goes out of the bottom groove portion 11a through the other entrance/exit 11g thereof, and moves to the adjacent cutout groove portion 11b. Then, the engagement member 31 sequentially advances inside of each bottomed groove portion 11a and cutout groove portion 11b one after another and is finally attached to the groove portion 11. In this way, the fixing member 30 is attached to the substrate 10.

FIGS. 5 and 6 show a sectional view taken along line a-a and line b-b of FIG. 4, respectively. In the area of the bottomed groove portion 11a, for example, in the area illustrated by the sectional view taken along line a-a in FIG. 4, the fixing member 30 and the bonded portion 21a of the cover material 21 are located in the bottomed groove portion 11a as shown in FIG. 5. On the other hand, in the area of the cutout groove portion 11b, for example, in the area illustrated by the sectional view taken along line b-b in FIG. 4, the engagement member 31 of the fixing member 30 is engaged with the retainer 11c of the cutout groove portion 11b as shown in FIG. 6.

Since the engagement member 31 is engaged with the retainer 11c, the trim member 20 is firmly attached to the substrate 10 and disengagement of the trim member 20 from the substrate 10 is prevented. In this embodiment, the engagement member 31 has a trapezoidal shaped cross-section so as to allow the engagement member 31 to engage with the retainer 11c firmly.

After disposing the trim member 20 on the substrate 10 in this way, the substrate 10 is covered by the trim member 20. The surfaces 12, 13 of the substrate 10 are covered by the trim member. This step of covering the substrate 10 includes a step of fixing a terminal end of the trim member 20. At this step, the terminal end of the trim member 20 is turned back toward the substrate 10, and a terminal portion 20c is fixed on the substrate 10.

Figure 9:
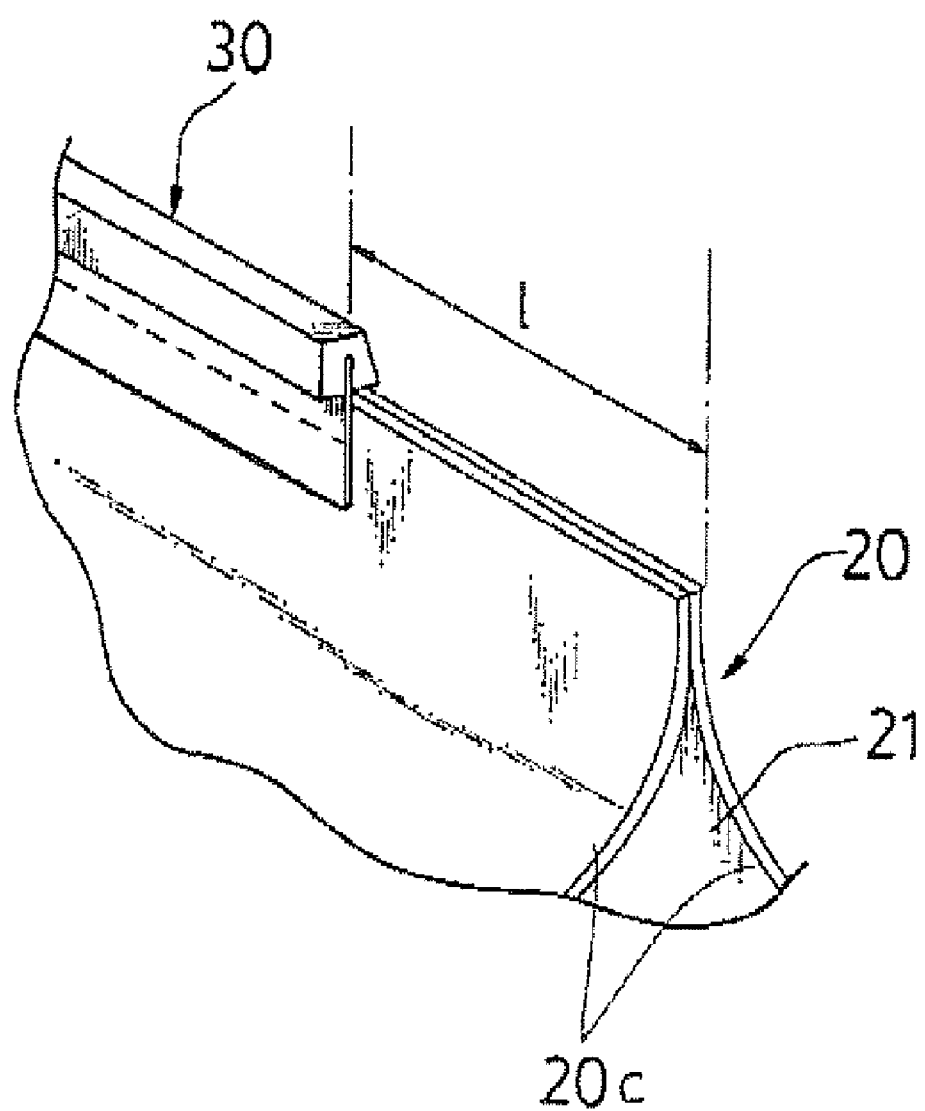
FIG. 9 is a perspective pictorial view of an embodiment of a fixing member for fixing a terminal portion of the trim member.

FIGS. 8 to 10 illustrate an exemplary embodiment of the fixation of the terminal end of the trim member 20. In the embodiment illustrated in FIGS. 8 to 10, the bottomed groove portion 11a is located at least in one end zone of the groove portion 11. Projections 11e are provided at the entrance/exit 11g on the outside of the bottomed groove portion 11a, and extend from walls 11d of the bottomed groove portion 11a. The projections 11e narrow the width of the entrance/exit 11g.

Additionally, as illustrated in FIG. 9, the cover material 21 is set to be longer than the fixing member 30 by the length l when the fixing member 30 is mounted to the cover material 21. The cover materials 21 are not seamed together in the area where the fixing member 30 is not mounted to.

Accordingly, as shown in FIG. 10, when the substrate 10 is covered by the trim member 20, the trim member 20 can be held between the projections 11e of the entrance/exit 11g and can be fixed to the bottomed groove portion 11a. Since the terminal portion 20c of the trim member 20 is fixed on the substrate 10, the trim member 20 can be bonded tightly to the substrate 10, and sagging of the trim member 20 around the groove can be prevented.

Also, as mentioned above, since the trim member 20 is set to be longer than the fixing member 30 by the length l, the engagement member 31 of the fixing member 30 is blocked by the projections 11e of the bottomed groove portion 11a and can not protrude from the entrance/exit 11g outwardly, therefore only the cover material 21 protrudes therefrom.

As shown in FIG. 10, the cover material 21 is held by the projections 11e and fixed on the substrate 10. Also, the l-length portion of the cover material 21 extending from the bottomed groove portion 11a is turned back toward the substrate 10 and covers the peripheral portion of the substrate 10. In this manner, the center pad 3 covered by the trim member 20 is formed. According to this embodiment, despite the substrate 10 having an integral structure, the center pad 3, which appears vertically divided as shown in FIG. 2, can be obtained by assembling the substrate 10 and the trim member 20.

FIG. 11 is a perspective view of an alternative embodiment of a groove portion 11. The cutout groove portion 11b of the groove portion 11 of this embodiment is provided with a slant surface 11f. The slant surface 11f is tilted toward one of the adjacent bottomed groove portions 11. The slant surface 11f continues to the surface of the entrance/exit 11g of the bottomed groove portion 11a adjacent to the slant surface 11f.

Figure 12:
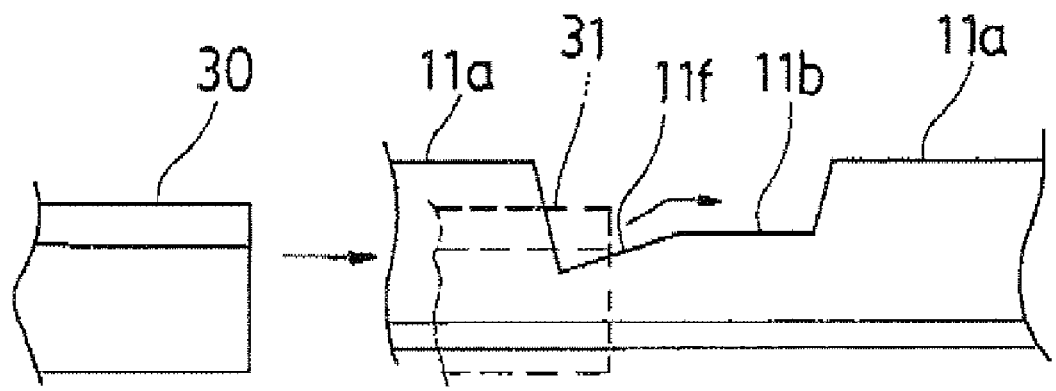
FIG. 12 is a side view of the embodiment shown in FIG. 11.

Since the cutout groove portion 11b has the slant surface 11f, when disposing the fixing member 30 in the groove portion 11, the engagement member 31, having passed the bottomed groove portion 11a, rides and slides on the slant surface 11f and is guided into the subsequent bottomed groove portion 11a as shown in FIG. 12. Therefore, the slant surface 11f prevents the engagement member 31 from being caught between the bottomed groove portion 11a and the cutout groove portion 11b, and the fixing member 30 can be disposed smoothly.

Figure 13:
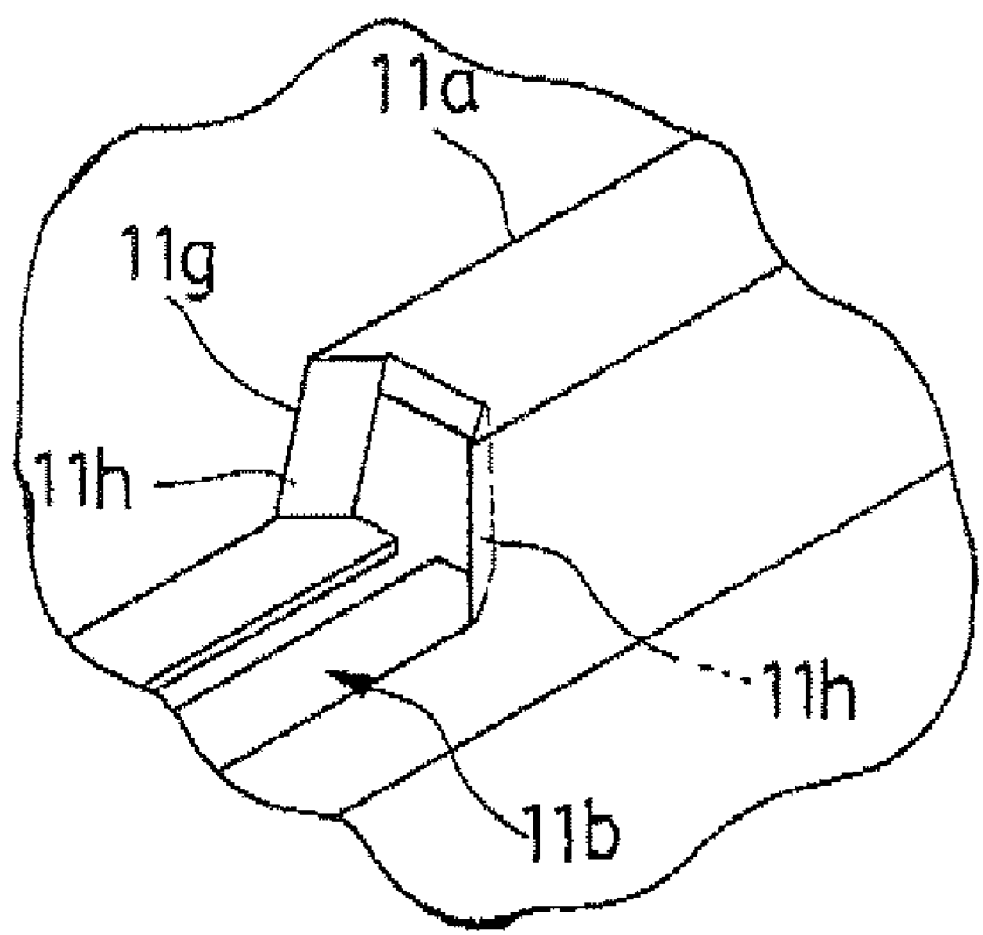
FIG. 13 is a perspective view of another alternative embodiment of the groove portion.
Figure 14:
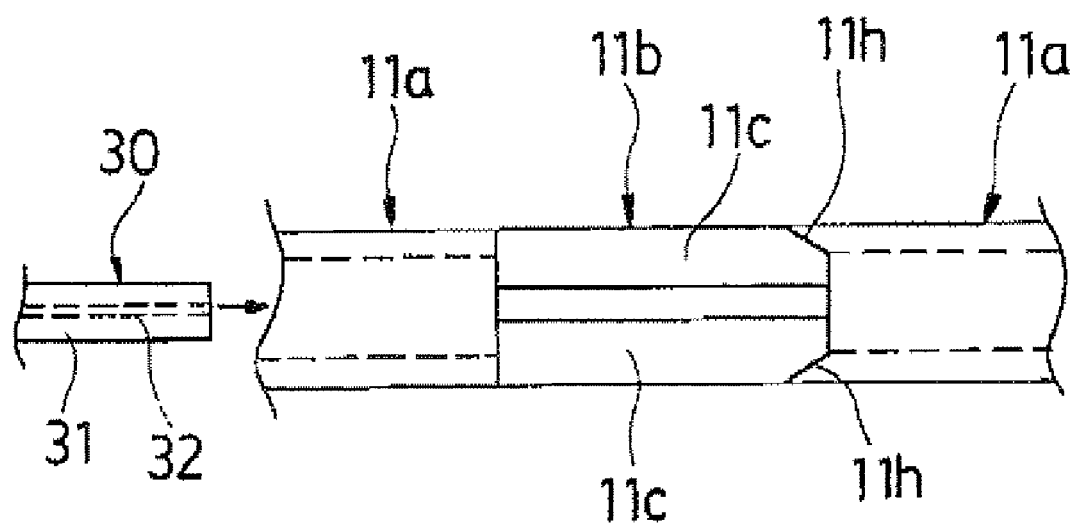
FIG. 14 is a plan view of the embodiment shown in FIG. 13.
Figure 15:
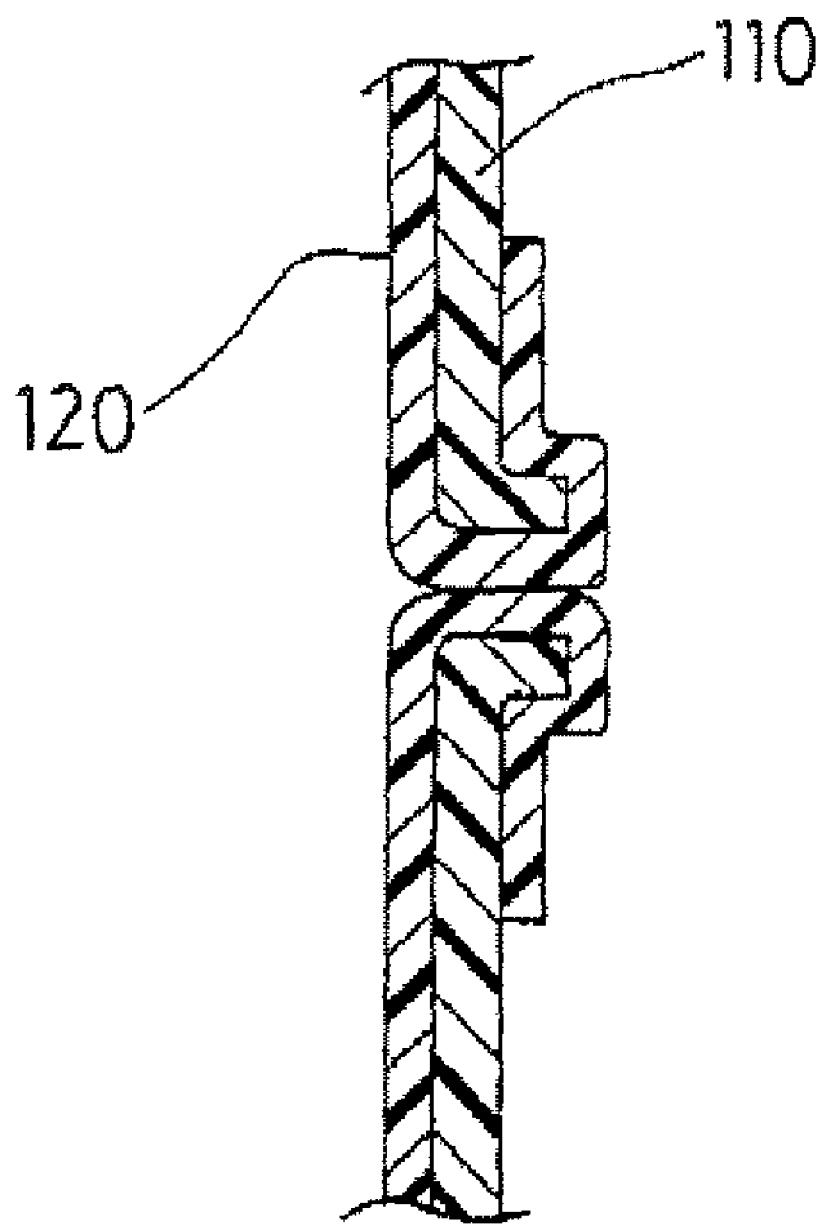
FIG. 15 is a sectional view of a prior art embodiment.

FIGS. 13 and 14 show another alternative embodiment of the groove portion 11. The entrance/exit 11g, which the fixing member 30 enters, comprises a tapered portion 11h at its end. The tapered portion 11h is comprised of a pair of inner surfaces tilted in the longitudinal direction of the groove portion 11 toward the inside of the bottomed groove portion 11a. By providing the tapered portion 11h at the entrance/exit 11g as described here, when the engagement member 31 is disposed in the groove portion 11, the engagement member 31 can be smoothly inserted into the bottomed groove portion 11a as it is guided by the tapered portion 11h.

As discussed above, according to the above-mentioned embodiment, a vehicle interior trim component with trim members in a plurality of adjacent areas can be provided by using an integral substrate instead of using a plurality of substrates of the known art. Therefore, the vehicle interior trim component can externally appear to have separated trim members despite the substrate 10 having an integral structure. The vehicle interior trim component does not require a plurality of dies for molding a plurality of substrates, and this leads to lower costs.

Also, according to the above-mentioned embodiment, the vehicle interior trim component with trim members in a plurality of adjacent areas, can be provided by providing a groove portion and by locating the edge of trim members in the groove portion. Therefore, the vehicle interior trim component does not require reequipping of manufacturing line and reduces the number of stages of work and costs. Moreover, since the terminal portion of the trim member is fixed on the groove portion of the substrate, the vehicle interior trim component can provide an aesthetically pleasing appearance. A plurality of decorated areas are prevented from being separated from each other by a gap. Since the boundary portion of the trim member is attached to the groove portion by insertion through its one end, the trim member can be easily disposed. Moreover, since the fixing member is made of the first portion connected to the boundary portion of the trim member and the second portion connected to the first portion and engaged with the retainer, the fixing member can be easily mounted to the trim member.

Although the vehicle interior trim component and the method of the present invention has been embodied above in relation to the door trim decorated by the trim member, it should be understood that the present invention is not limited to this and is applicable to various vehicle interior trim components. Reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware components configured to perform the specified functions. Furthermore, the present invention could employ any number of conventional techniques for configuration. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

What is claimed is:

1. A vehicle interior trim component comprising:
a substrate provided with a groove portion, wherein the groove portion has a bottom, wherein the groove portion has a plurality of bottomed groove portions and a plurality of cutout groove portions, and wherein the cutout groove portions comprise portions of the groove portion with the bottom of the groove portion cut out; and
a trim member provided with a first cover portion, a second cover portion, and a fixing member mounted on a boundary portion between the first cover portion and the second cover portion, the trim member covering the substrate;
wherein the boundary portion including the fixing member is attached to the groove portion by longitudinal insertion through one end of the groove portion;
wherein each of the cutout groove portions is provided on its edge with a retainer for retaining the fixing member; and
wherein the fixing member comprises a retainer engagement portion, wherein the retainer engagement portion engages the retainer to fix the trim member to the substrate, and wherein the retainer engagement portion is shorter than a distance between the retainer and the bottom of the groove portion.

2. The vehicle interior trim component according to claim 1, wherein the fixing member comprises a first portion connected to the boundary portion of the trim member and a second portion connected to the first portion and engaged with the retainer.

3. The vehicle interior trim component according to claim 2, wherein the first portion is made of material softer than the second portion material.

4. The vehicle interior trim component according to claim 1, wherein the groove portion is provided in one longitudinally disposed end zone thereof with a mechanism that holds the trim member to the substrate for fixing the trim member to the substrate.

5. The vehicle interior trim component according to claim 1, wherein the groove portion is provided at a longitudinal end thereof with a pair of projections extending respectively from a pair of walls of the groove portion.

6. The vehicle interior trim component according to claim 1, wherein the groove portion is provided at a longitudinal end thereof with one of the bottomed groove portions, the bottomed groove portion provided in its one end zone constituting its entrance-exit with a pair of projections extending respectively from a pair of walls of the groove portion, the projections narrowing the width of the entrance-exit.

7. The vehicle interior trim component according to claim 1, wherein each of the bottomed groove portions is provided at one end thereof adjacent to one of the cutout groove portions with a tapered portion, a pair of inner surfaces of the tapered portion tilted in a longitudinal direction of the groove portion toward an inside of the bottomed groove portion.

8. The vehicle interior trim component according to claim 1, wherein each of the cutout groove portions is provided at one end thereof with a slant surface tilted toward an adjacent bottomed groove portion.

9. The vehicle interior trim component according to claim 8, wherein each of the bottomed groove portions is provided at one end thereof adjacent to one of the cutout groove portions with a tapered portion, a pair of inner surfaces of the tapered portion being tilted in a longitudinal direction of the groove portion toward an inside of the bottomed groove portion.

10. A vehicle interior trim component comprising:
a substrate provided with an elongated groove, wherein the elongated groove is defined by first and second side walls, wherein the elongated groove has a plurality of first groove portions and a plurality of second groove portions, wherein each of the first groove portions includes a bottom contacting the first and second side walls, and wherein each of the second groove portions has no bottom contacting the first and second side walls; and, a trim member provided with a cover and an elongated fixing member, wherein the cover of the trim member covers the substrate, wherein the elongated fixing member is contained within the elongated groove and stops short of passing through the bottom, and wherein at least some of the groove portions includes a retainer edge that retains the elongated fixing member within the elongated groove.

11. The vehicle interior trim component according to claim 10, wherein the elongated groove has longitudinally disposed opposing first and second ends, and wherein the first end is provided with a mechanism that stops the elongated fixing member from passing beyond the first end.

12. The vehicle interior trim component according to claim 10, wherein each of the first groove portions includes longitudinally disposed opposing first and second ends, wherein the first and second side walls at each of the first ends are tapered so as to guide the elongated fixing member during insertion of the elongated fixing member through the elongated groove.

13. The vehicle interior trim component according to claim 10, wherein a portion of the first and second side walls in each of the second groove portions forms a ramp on which the elongated fixing member slides during insertion of the elongated fixing member through the elongated groove such that the elongated fixing member moves in a direction toward the bottom of an adjacent first groove portion.

* * * * *